United States Patent [19]

Bourbigot et al.

[11] Patent Number: 4,795,557
[45] Date of Patent: Jan. 3, 1989

[54] APPARATUS FOR GAS TRANSFER AND FLOTATION FOR TREATING WATER TO BE PURIFIED

[75] Inventors: Marie-Marguerite Bourbigot, Garches; Michel Faivre, Achers, both of France

[73] Assignee: OTV (Omnium de Traitements et de Valorisation), Courbevoie, France

[21] Appl. No.: 61,827

[22] Filed: Jun. 10, 1987

[30] Foreign Application Priority Data

Jun. 18, 1986 [FR] France ................. 86 08780

[51] Int. Cl.$^4$ ................................. B01D 19/04
[52] U.S. Cl. ................. 210/221.2; 210/706; 55/196; 209/170
[58] Field of Search .............. 209/170; 210/704–706, 210/209, 221.1, 221.2, 220; 55/52, 53, 196

[56] References Cited

U.S. PATENT DOCUMENTS

| | | | |
|---|---|---|---|
| 3,386,228 | 6/1968 | Hartmann | 55/196 |
| 4,237,004 | 12/1980 | Helke | 210/221.1 X |
| 4,338,192 | 7/1982 | Krasnoff et al. | 210/221.2 |
| 4,376,701 | 3/1983 | Fujimoto et al. | 210/221.2 X |
| 4,507,253 | 3/1985 | Wisemann | 210/221.2 X |
| 4,534,774 | 8/1985 | Lecoffre et al. | 55/196 X |
| 4,652,370 | 3/1987 | Bachhofer et al. | 210/209 X |
| 4,659,345 | 4/1987 | Mojonnier | 55/165 |

Primary Examiner—Charles Hart
Attorney, Agent, or Firm—Browdy and Neimark

[57] ABSTRACT

Apparatus for treating water by gaseous diffusion and flotation comprising a single reactor which is separated into at least two compartments. One compartment is used for gas transfer with a pressurized gas diffuser flushed by a liquid current wherein water to be treated is introduced downwardly. The other compartment is in communication with the first compartment by means of an orifice whose opening diameter and orientation are controlled.

23 Claims, 4 Drawing Sheets

APPARATUS FOR GAS TRANSFER AND FLOTATION FOR TREATING WATER TO BE PURIFIED

FIELD OF THE INVENTION

This invention relates to the field of transfers between gas phase and liquid phase and relates more particularly to a device making it possible to increase the transfer efficiencies and to improve the solubility of a gas in a liquid by generation of bubbles through a porous material within a contact volume. It relates also but not exclusively to the use of such a device for making water potable and purification of municipal and industrial waste waters by a combined ozonization and flotation system.

BACKGROUND OF THE INVENTION

In the most varied technical fields, numerous cases are known where problems arise of diffusion and solubilizing of a gas phase in a liquid phase. For example, when the liquid is water, it is possible to cite, in a nonlimiting way: injection of carbon dioxide gas in water to be remineralized, with the addition of calcium carbonate; injection of ozone in water to be disinfected; sending of air in activated sludge according to processes of biological treatment of water; the introduction into water to be purified, according to the flotation technique, of a gas having a mechanical role in the use of this technique, etc.

In all these cases the problem arises of obtaining certain dimensions of gas bubbles, which are able to furnish an acceptable transfer coefficient, as well as the rising speed of the bubbles in the liquid, for example in a contact volume (or reactor) constituted, for example, by a bubble column.

Several techniques have been proposed or used to obtain microbubbles of gas intended to saturate an ambient liquid. For example, in the case of water, one of them comprises saturating water with gas (air, oxygen, ozone) in an enclosure kept under pressure then expansion of the water before entry into the contact reactor: thus very fine gas bubbles are obtained with an average diameter of 40 to 100 microns. However, this process requires a considerable expenditure of energy and, further, the microbubbles have a very slow rising speed in the liquid, which can constitute a serious obstacle in some applications.

According to other known processes, an effort is made to obtain a homogeneous series of microbubbles by making a slightly compressed gas diffuse through an element of porous material, for example, with a base of ceramic or sintered metal, whose chosen porosity is a function of the various parameters of application envisaged. However, according to a general phenomenon noted with such systems, the microbubbles have a tendency not to become detached from the porous element from which they have come, after having reached a size of several millimeters, sufficient for the buoyancy to be able to overcome the surface tension forces. They then form a trail of large bubbles which rises very quickly in the contact column, at speeds of at least 20 to 25 cm/s. The dispersion obtained is then quite often insufficient and the loss of gas is considerable.

To improve the transfer efficiencies—gas phase-liquid phase in the context of this diffusion technique by porous material—it has proven advantageous, during injection of pressurized gas under the porous device, to flush the surface of this latter with a liquid current (see, for example, the patents U.S. Pat. No. 3,545,731 and France publication No. 2 421 671).

In water treatment installations, the gaseous fluid is generally made up of oxygenated air, or preferably, of ozonized air. It is known that ozone is a good bactericide and virucide, which improves the organoleptic qualities of water and which, besides its oxidation properties, particularly for iron and manganese, constitutes a good flocculating adjuvant. With an equal quality of settled water, it makes possible a saving of coagulant and, with an equal amount of coagulant, it makes it possible to eliminate dissolved organic materials better. However, ozonization has a disturbing impact when it is followed by a standard settling because of the phenomena of spontaneous flotation in flocculators and settling tanks.

However, in current practice known, the two phases of ozonization and then of flotation are successively used in water treatment installations.

SUMMARY OF THE INVENTION

One of the essential objects of the invention is to seek to combine a gas transfer (particularly by ozonization) and flotation in a unit for pretreatment of water to be purified, after flocculating and before filtering of the latter, by a system referred to above resorting to diffusion of gas through a porous material and the segregation of gas bubbles by the entraining speed of the water.

Another object is to reduce the investment and operating costs and make the treatment installations more reliable by using a single reactor, while obtaining purification results notably improved by this judicious combination of flotation and ozonization.

Still another object is to be able to transform with advantage the disturbing phenomenon of spontaneous flotation produced during ozonization in the settling tanks and/or flocculators and advantageously to associate the spontaneous effect due to preozonization and the effect of flotation itself, while avoiding the stagnation of foam in the current tanks in the flocculators. Among the other advantages, such a process makes it possible to increase considerably the elimination of algae and that of iron and manganese.

To achieve these objects, the present invention proposes an apparatus for transfer of gas and flotation with ozonization through a porous disk (or equivalent) and flushing of the surface of the latter with a liquid current, wherein the operation is performed in a single separate reactor in at least two compartments in communication with each other. The apparatus comprises at least one first gas transfer compartment, equipped with at least one pressurized gas diffuser whose surface is flushed by a liquid current in a liquid-gas flow ratio greater than 0.5 and in which the water to be treated is introduced downward; at least one second adjacent flotation compartment; said communication being performed by means of at least one orifice located in the lower part of the separating partition or partitions of the compartment and whose sections/and opening orientation are such that the passage speed Vs of the water current between the gas transfer and flotation compartments is greater than the rising speed Va of the gas bubbles in the transfer compartment.

As will be explained below in detail in this description, the compartments are created in the reactor by separating partitions, each of which is constituted by two stationary or mobile walls, and which can have different positions and orientations but which are always calculated so that, during the passage or free space made between them, said speed conditions ar respected.

One of the aims in mind during development and by the use of the device according to the invention was to join in this combination of flocculation and flotation of the water to be purified the optimal agitation and homogenization conditions for the formation of flocs. These conditions can be summarized as follows:

The gas bubbles, generated by the diffuser or diffusers, and with average diameters less than 2 mm, are formed in a large number and with a more homogeneous size, with a good dispersion in the water mass, as a result of the flushing of the porous surface by the crosswise liquid current (which can be raw water, flocculated water or also treated water). The water current to be treated, sent in a rising manner above the group of bubbles in the gas transfer compartment, selects and transports the fine bubbles—for example from 50 to 500 microns—in the flotation compartment or compartments by passage through said spaces or orifices at a speed Vs which in practice should be greater than 100 m/h. Acceleration of the water speed, during this passage, facilitates the collisions between microflocs and thus improves their agglomeration. In this regard it will be noted that the rising speed Vf of the bubbles in the flotation enclosure should be greater than speed V of the treatment water, at the outlet of the reactor, so as not to entrain gas bubbles and/or ballasted floc toward said outlet. This outlet speed of the water is advantageously between 10 and 30 m/h.

The largest gas bubbles coming from the diffuser—for example with diameters of 500 microns to 2 mm—and whose speed Va is greater than Vs (in practice above 400 m/h) rise in the gas transfer or diffusion cmpartment and transfer over the entire height of the reactor the gas that they contain, for example ozone, as will be seen in the applications below.

Such a system of selection of gas bubbles, as a result of the parameters defined above, make it possible to separate sufficiently fine bubbles so that bubbles of too large a size are fixed on the flocs of polluting material, flocs which could not play any role in the flotation but would be able to disturb the formation of floating material on the reactor surface, which should not rise too rapidly.

In practice, according to one advantageous application of the invention, the gas generated by the diffusers, under an average pressure of 0.05 to 0.1 megapascal and at a flow generally set at a rate less than 20 m$^3$ per hour and per m$^2$ of porous surface, is made up of air or ozonized oxygen, the ozone concentration generally being kept between 10 and 30 g per m$^3$ of ozonized air or 40 to 100 g per m$^3$ of oxygen. In the process of the invention, the ozone acts as a good flocculation adjuvant according to mechanisms still poorly understood which particularly cause the intervention of: increasing the number of carboxylic functional groups in the medium (which improve the absorption of the organic materials on aluminum and iron oxides), and polymerization of organic compounds with formation of varied biopolymers (nucleic acids, proteins, polysaccharides) which make the action of the ozone very effective on water charged with algae.

Such an ozonization-flotation, upstream from a filtration, by sand filter or other, makes possible an increase of the filtration cycle periods which can amount to 60%, particularly because the clogging power of the filter is reduced by at least 70%. A part of the clogging materials has been eliminated by flotation, while the other part has been destroyed by ozone. Further, the floc, formed in the flotation compartment of the reactor, is better held on the filters, so that the quality of the filtered water is clearly improved. For example, it was found, during tests of the technique according to the invention, that unfiltered water that had not undergone ozonization-flotation pretreatment had turbidities of 0.4 to 0.5 NTU (NTU=Nephelometry Turbidity Unit), while, by use of the process of the invention, the turbidity generally dropped to 0.1 NTU.

The technique described above is particularly, although not exclusively, suited to treatment of colored waters, charged with algae but slightly turbid and not requiring the use of a settling tank: Generally these waters are slightly mineralized. According to an improvement of the invention, it is possible to remineralize these waters by taking advantage of good homogenization conditions that exists in the reactor. For this purpose, it is possible to saturate with $CO_2$ the water used for flushing the surface of the porous materials (or diffusers), for eample by injection of Seltzer water or use, for this flushing, of bicarbonated water by addition of milk of lime to water charged with $CO_2$. The increase of the complexing with calcium leads to an improvement of the absorption of the orgainic compounds on the floc.

DESCRIPTION OF THE DRAWINGS

The invention will now be better understood from the detailed description of nonlimiting modes and examples of embodiment illustrated by the accompanying drawings which show.

Figure 1:
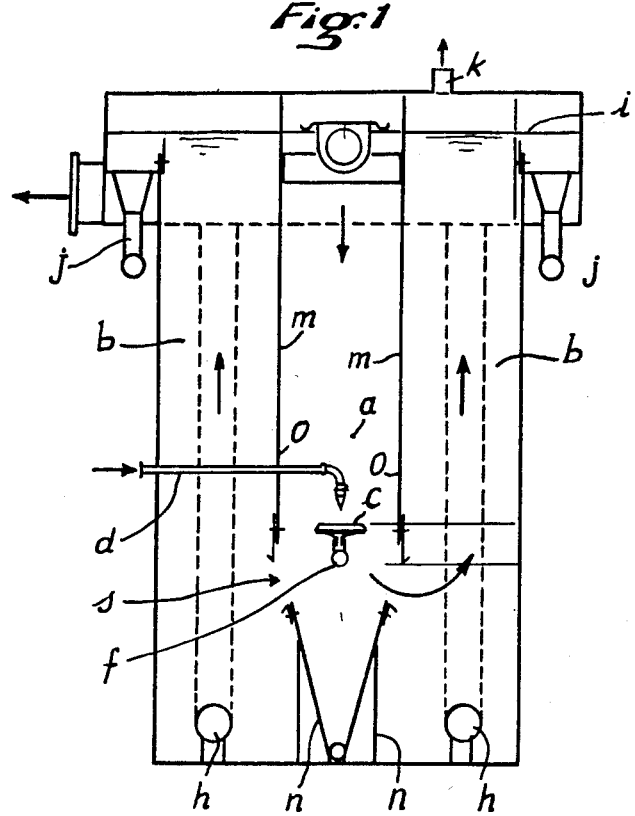
FIG. 1: a type of reactor according to the principle of the invention.
Figure 2:
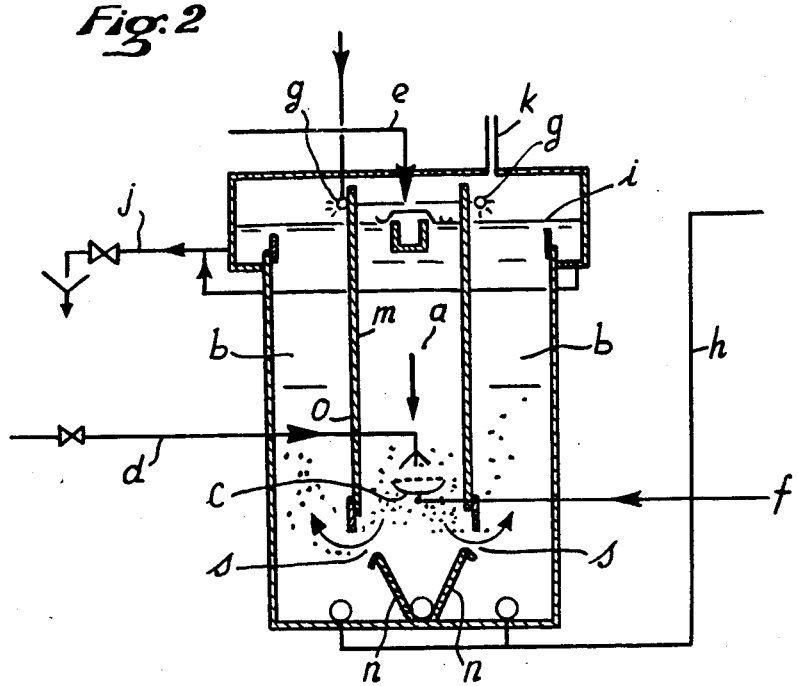
FIG. 2: a view in section of the same type of reactor.
Figure 3:
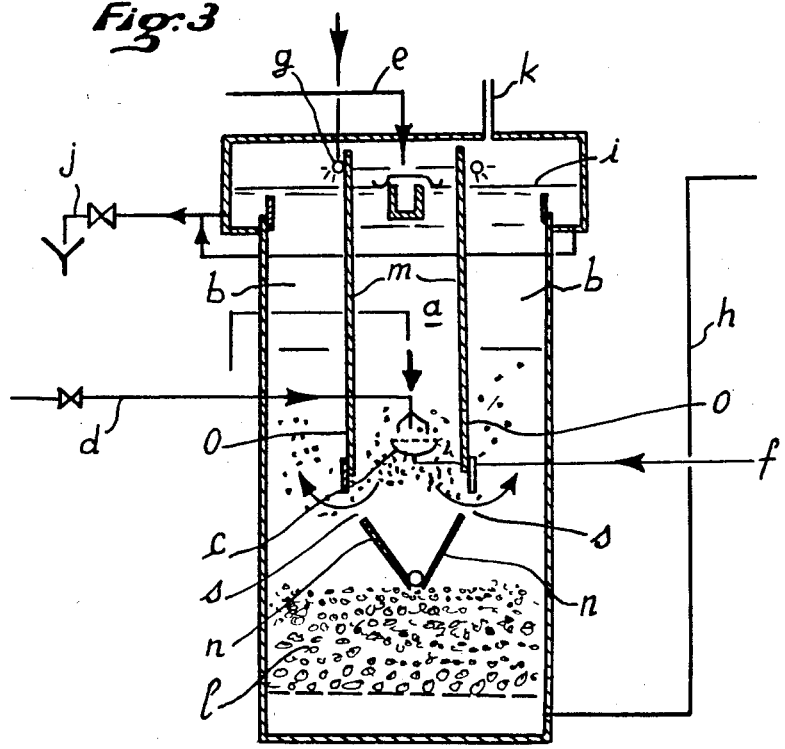
FIG. 3: a variant embodiment of the reactor according to FIG. 2.
Figure 4:
FIGS. 4 to 12: various embodiments and positions of the two separating partitions of each compartment in the reactor.
Figure 5:
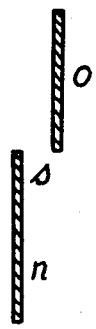

As represented in FIGS. 1 to 3, the single reactor of gas transfer (or diffusion) and flotation is divided here into three compartments, namely a central diffusion compartment a and two lateral flotation compartments b. Compartment a contains at least one porous plate or gas diffuser c which is flushed by a liquid current (here water) carried by pipe d. The water to be treated arrives by pipe e in the top of the reactor in a descending current and the pressurized gas (here, for example, ozonized gas) arrives by pipe f, the ozonized gas vents being evacuated by pipe k. The water to be treated passes, according to the arrows indicated in FIGS. 1 to 3, from central compartment a to flotation compartments b by going through an opening (or orifice) of section s which is in the lower part of each partition m separating the compartments and constituted by an upper wall o and a lower wall n which here is inclined in FIGS. 1 to 3 while upper wall o is in a vertical position.

Figure 18:
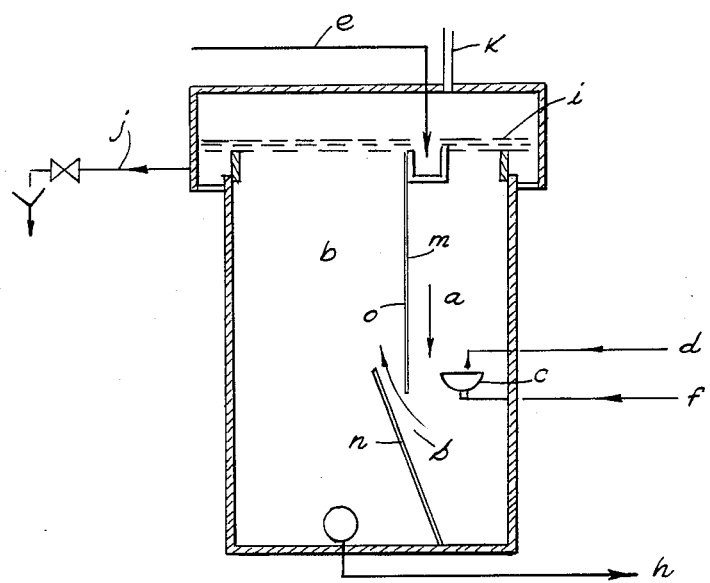
FIG. 18: a device similar to that of FIG. 1, but having only one flotation chamber.

The treated water leaves flotation compartments b by pipes h while the floating materials (or flocs) are evacuated by lowering of water level i then exit by pipes j. According to another embodiment illustrated in FIG. 2, water level i is sprinkled by a sprinkling device g which facilitates the evacuation of the floating materials by pipes j after lowering of water level i. The FIG. 18 embodiment is virtually identical to that of FIG. 1, but only includes one flotation chamber.

According to the embodiment illustrated in FIG. 3 (in all other points identical with FIG. 2), a bed 1 of filtering material can be placed in the lower part of the reactor.

Figure 6:
Figure 7:
Figure 8:
Figure 9:
Figure 10:
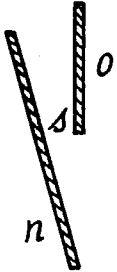

According to FIGS. 4 to 12, it is seen that walls o and n of each separating partition m between the compartments can have various positions and orientations. For example, they can be placed in vertical alignment (FIG. 4) or offset in relation to one another (FIG. 5) with the wall n overshooting, in height, the lower end of wall o (FIG. 6). According to the embodiments of FIGS. 7 to 9, one of walls o and n can be inclined and the other vertical, or both inclined. In FIG. 10 the walls are arranged to obtain, in the part surmounting section s, a zone of less turbulence facilitating flotation in compartments b.

Figure 11:

In the variant illustrated in FIG. 11, wall n is inclined and greatly overshoots the lower end of upper wall o. Further, the two walls can mobile, as indicated by the arrows and broken lines and section s can be adjusted most suitably for passage of fine bubbles of gas and liquid from compartment a to compartments b.

Figure 12:
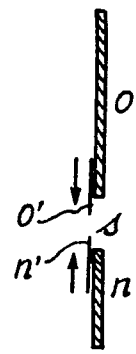

In FIG. 12, the two walls o and n are equipped, in their respective extensions, with mobile parts o' and n' which also allow suitable fitting of section s of passage between the two walls.

Figure 13:
FIGS. 13 and 14: various types of orifices defining the communication or opening between partitions.
Figure 14:

FIGS. 13 and 14 illustrate nonlimiting embodiments where passage section s is comprises either two orifices s' or a series s" of four orifices. The number of orifices is not limited to one, two, or four, however.

Figure 15:
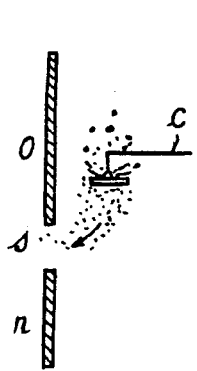
FIGS. 15 to 17: several variants of positioning of the gas diffuser systems in the reaction according to the invention.
Figure 16:
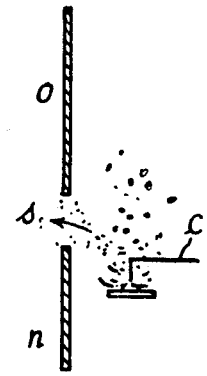
Figure 17:
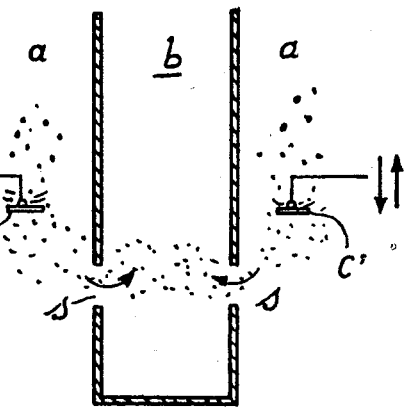

Finally, FIGS. 15 to 17 show embodiments relating to location and/or number of gas diffusion systems c. Contrary to the case of FIGS. 1 to 3, this diffuser c, installed in central compartment a can be placed either above (FIG. 15) or below (FIG. 1 16) the appropriate passage section s. According to the embodiment of FIG. 17, the flotation zone according to the invention here comprises a central compartment b, while diffusion compartments a are located on each side of compartment b. Further, it is important to note, as the corresponding arrows indicate, that diffusion systems c and c' are adjustable here in height as the user desires.

Numerous studies and experiments have been made in the field of treatment of waters by ozonization-flotation according to the principles listed above. There will be summarized below, by way of illustration, the results obtained in a pilot reactor of rectangular shape placed downstream from a system for rapid mixing of standard coagulating reagents and upstream from a sand and/or anthracite filtration.

The reactor was of the type of FIG. 1 (or FIG. 2) with the following main parameters:
  diffuser (c) of bubbles of 150 microns to 1.8 mm in diameter
  rising speed of the bubbles in compartment (a): 0.01 to 0.18 m/s
  passage section (s) of 0.0102 m$^2$ giving a speed Vs of 0.048 m/s for a water flow of $5 \times 10^{-4}$ m 3/s delivered by pipe (e)
  section of each flotation compartment (b): 0.0748 m$^2$ resulting in a speed V of floated water of: $6.6 \times 10^{-3}$ m/s for a water flow of $5 \times 10^{-4}$ m 3/s, this speed being such that it cannot entrain gas bubbles and ballasted floc to outlet (j) of the reactor.

It will be noted that in the diffusion zone (compartment a) the gas bubbles with a diameter greater than 400–500 microns and whose speed Va is greater than Vs (0.048 m/s) are not entrained by the water current through passage section s between compartments a and b. These bubbles assure, by travelling in a direction countercurrent to the ascending water to be treated, the transfer of the ozone that they contain over the entire height of the reactor. They thus participate in the hydraulic mixing beneficial for the development of flocculation which is begun in diffusion compartment a.

For example, water to be made potable which had an NTU of 5 and a Hazen coloring of 20 degrees was treated with the apparatus of the present invention. By way of comparison, tests were made—all conditions otherwise being equal—on the one hand, in the same type of reactor by diffusing only oxygen (without ozone) and, on the other hand, in the absence of the reactor according to the invention and simply by performing successive flocculation and filtration operations according to the standard method.

The water had been previously flocculated by at a rate of 3 g/m$^3$ of ferric chloride and, after treatment, it was filtered in a two-layer filter of 60 cm of sand with a grain diameter of 0.06 mm and of 60 cm of anthracite with a grain diameter of 1.4 to 2.5 mm.

In the case of ozonization treatment according to the invention, an ozonization rate of 0.6 g/m$^3$ of water was used, the gas coming from the diffuser (type c in the FIGS.) being ozonized oxygen with 40 to 50 g of ozone per m$^3$ of O$_2$.

The surface of the diffuser was flushed by a liquid flow representing about 10% of the amount of raw water to be treated.

The results are briefly summarized in table I below:

TABLE I

| | Operation with O$_3$ (ozonized oxygen) | Operation O$_2$ alone | Operation without O$_2$ and O$_3$ |
|---|---|---|---|
| Period of filtration cycle | 51 h 30 | 42 h | 37 h |
| Turbidity of filtered water | 0.14 NTU | 0.27 NTU | 0.24 NTU |
| Appearance of water | sparkling | not sparkling | not sparkling |
| Flocs observed in diffusion/flotation reactor | large homogeneous flocs (1 to 2 mm) | heterogeneous microflocs (less than 0.5 mm) | heterogeneous microflocs (less than 0.5 mm) |

It will be further noted that, in the treatment according to the invention (operation with O$_3$), an immediate stabilization was obtained of the turbidity level of treated water from the start of the filtration cycle for NTUs of 0.10 of 0.15 during the cycle. The washing period between filtration cycles was advantageously increased an average of 20 to 35% and further a considerable saving of flocculent material upstream from the treatment according to the invention could be noted.

In other series of tests on more clogging waters, particularly with "Beaudrey clogging power," BCP, of 25 to 58, these indices were able to be reduced, at the outlet of the reactor, to 6 and 15 respectively.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. Apparatus for combining the processes of gas transfer and flotation in one unit for pretreatment of water to be purified, said apparatus employing the diffusion of gas through a porous material and segregation of gas bubbles by entraining speed of the water to be purified, said apparatus comprising:

a reactor which is separated by at least one partition into at least two adjacent communicating compartments, said at least two compartments comprising at least one gas transfer compartment and at least one flotation compartment;

said gas transfer compartment provided with at least one pressurized gas diffuser generating bubbles with a diameter less than 2 mm, flushing means for flushing the surface of said gas diffuser by a liquid current in a liquid/gas flow ratio greater than 0.5 and an inlet in said gas transfer compartment, above said flushing means, for introducing water to be treated downwardly into said gas transfer compartment;

at least one orifice located in said at least one partition between said compartments, the sections and opening orientation of said orifice being such that the speed Vs of the passage of a current of water between said gas transfer and said flotation compartments is greater than the rising speed Va of the gas bubbles in said transfer compartment.

2. The apparatus of claim 1 wherein each partition comprises two vertical walls in alignment whereby said orifice is located between said vertical walls.

3. The apparatus of claim 1 wherein each partition comprises vertical walls offset in relation to one another sufficient to leave space for said orifice.

4. The apparatus of claim 1 wherein each partition comprises two walls, at least one of which is in an inclined position relative to the other, the clearance between said walls forming said orifice.

5. The apparatus of claim 2 wherein said walls are stationary.

6. The apparatus of claim 2 wherein said walls are mobile.

7. The apparatus of claim 3 wherein said walls are stationary.

8. The apparatus of claim 3 wherein said walls are mobile.

9. The apparatus of claim 4 wherein said walls are stationary.

10. The apparatus of claim 4 wherein said walls are mobile.

11. The apparatus of claim 2 wherein at least two orifices are provided between the walls.

12. The apparatus of claim 3 wherein at least two orifices are provided between the walls.

13. The apparatus of claim 4 wherein at least two orifices are provided between the walls.

14. The apparatus of claim 5 wherein at least two orifices are provided between the walls.

15. The apparatus of claim 6 wherein at least two orifices are provided between the walls.

16. The apparatus of claim 1 wherein the gas diffuser is located above the level of the orifice between said compartments.

17. The apparatus of claim 1 wherein the gas diffuser is located below the level of the orifice beween said compartments.

18. The apparatus of claim 1 wherein the speed Vs is maintained at more than 100 m/hr and the speed Vs of the gas bubbles in the flotation compartment is greater than the speed V of the treated water at the outlet of the reactor, the speed V being from 10 to 30 m/hr.

19. The apparatus of claim 1 wherein the gas is selected from the group consisting of air and ozonized oxygen containing from 40 to 100 grams of ozone per cubic meter of oxygen.

20. The apparatus of claim 1 wherein the water used for flushing the surface of the gas diffuser is selected from the group consisting of bicarbonated water and water saturated with carbon dioxide.

21. The apparatus of claim 1 wherein a bed of filtering material is installed in the lower part of the reactor.

22. The apparatus of claim 1, wherein an outlet for purified water is provided in said flotation compartment at a level below that of said orifice.

23. The apparatus of claim 21, wherein an outlet for purified water is provided in said flotation compartment in a space beneath said bed of filtering material.

* * * * *